United States Patent
Miyasaka (10) Patent No.: US 10,870,281 B2
(45) Date of Patent: Dec. 22, 2020

(54) LIQUID ABSORBER, INK ABSORBING DEVICE, AND LIQUID DROPLET EJECTION APPARATUS

(71) Applicant: SEIKO EPSON CORPORATION, Tokyo (JP)

(72) Inventor: Yoichi Miyasaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/744,313

(22) Filed: Jan. 16, 2020

(65) Prior Publication Data

US 2020/0230964 A1 Jul. 23, 2020

(30) Foreign Application Priority Data

Jan. 18, 2019 (JP) ................................ 2019-007136

(51) Int. Cl.
  *B41J 2/17* (2006.01)
  *B41J 2/165* (2006.01)
  *B41J 2/185* (2006.01)

(52) U.S. Cl.
  CPC ......... *B41J 2/1721* (2013.01); *B41J 2/16523* (2013.01); *B41J 2/16508* (2013.01); *B41J 2/185* (2013.01); *B41J 2002/1742* (2013.01); *B41J 2002/1856* (2013.01)

(58) Field of Classification Search
  CPC .. B41J 2/16523; B41J 2/1721; B41J 2/16505; B41J 2/16517
  See application file for complete search history.

(56) References Cited

U.S. PATENT DOCUMENTS

| 9,039,135 | B2 | 5/2015 | Kaneko | |
|---|---|---|---|---|
| 2007/0119301 | A1 | 5/2007 | Abe | |
| 2014/0055522 | A1 | 2/2014 | Kaneko | |
| 2014/0184691 | A1* | 7/2014 | Takano et al. | ....... B41J 2/16523 |
| 2014/0184693 | A1* | 7/2014 | Tsujino et al. | ......... B41J 2/1721 |
| 2015/0376353 | A1* | 12/2015 | Takebe et al. | ........... C08J 5/042 |

FOREIGN PATENT DOCUMENTS

| JP | 08-311755 A | 11/1996 |
|---|---|---|
| JP | 2000-135797 A | 5/2000 |
| JP | 2012-001851 A | 1/2012 |
| JP | 2014-040045 A | 3/2014 |

* cited by examiner

*Primary Examiner* — Juanita D Jackson
(74) *Attorney, Agent, or Firm* — Global IP Counselors, LLP (57) ABSTRACT

A liquid absorber includes a plurality of small parts each including a first layer containing fibers, a second layer containing fibers, and a third layer which contains a water absorbing resin and which is provided between the first layer and the second layer. When the water absorbing resin is measured in accordance with a plastic thermogravimetric measurement method defined by JIS K 7120: 1987 under measurement conditions in which a sample amount is 5 to 15 mg, a temperature increase rate is 10.0° C./min, and a measurement atmosphere is nitrogen, from a TG curve obtained thereby, the ratio of a weight decrease amount of the water absorbing resin at 400° C. with respect to an initial weight thereof is 0.050 to less than 0.500.

7 Claims, 6 Drawing Sheets

LIQUID ABSORBER, INK ABSORBING DEVICE, AND LIQUID DROPLET EJECTION APPARATUS

The present application is based on, and claims priority from JP Application Serial Number 2019-007136, filed Jan. 18, 2019, the disclosure of which is hereby incorporated by reference herein in its entirety.

BACKGROUND

1. Technical Field

The present disclosure relates to a liquid absorber, an ink absorbing device, and a liquid droplet ejection apparatus.

2. Related Art

In an ink jet printer, when head cleaning is performed in order to prevent degradation in printing quality caused by ink clogging, and/or when an ink is filled after an ink cartridge is replaced, in general, a waste ink is generated. Accordingly, in order to prevent undesirable adhesion of the waste ink as described above to a mechanism and the like in the printer, the ink jet printer includes a liquid absorber absorbing the waste ink.

For example, JP-A-2014-40045 has disclosed a liquid absorber including cellulose fibers, a thermal fusion material, and a flame retardant material, and in the liquid absorber described above, when an electric conductivity of an ink is represented by $\sigma_0$ [µS/cm], and an electric conductivity obtained when 1 g of the flame retardant material is mixed with 5 g of the ink is represented by $\sigma_1$ [µS/cm], $\sigma_1 - \sigma_0 \leq 500$ is satisfied. To the liquid absorber as described above, a flame retardant property is imparted. Hence, the safety of the ink jet printer can be improved.

On the other hand, depending on the type of flame retardant material, aggregation may occur by a reaction with the ink in some cases. The aggregation as described above may degrade absorption characteristics of the liquid absorber in some cases. Hence, the liquid absorber disclosed in JP-A-2014-40045 has a problem in that the absorption characteristics are degraded depending on the combination with the ink.

SUMMARY

The present disclosure is made to at least overcome the problem described above and can be realized by the following aspects.

A liquid absorber according to one aspect of the present disclosure comprises: a plurality of small parts each including a first layer containing fibers, a second layer containing fibers, and a third layer which contains a water absorbing resin and which is provided between the first layer and the second layer. When the water absorbing resin is measured to obtain a TG curve in accordance with a plastic thermogravimetric measurement method defined by JIS K 7120: 1987 under measurement conditions in which a sample amount is 5 to 15 mg, a temperature increase rate is 10.0° C./min, and a measurement atmosphere is nitrogen, from the TG curve thus obtained, the ratio of a weight decrease amount of the water absorbing resin at 400° C. with respect to an initial weight thereof is 0.050 to less than 0.500.

An ink absorbing device according to another aspect of the present disclosure comprises: the liquid absorber according to the one aspect of the present disclosure; and a container receiving the liquid absorber.

A liquid droplet ejection apparatus according to still another aspect of the present disclosure comprises a recovery portion recovering a waste ink liquid, and the ink absorbing device according to the another aspect of the present disclosure is provided in the recovery portion.

DESCRIPTION OF EXEMPLARY EMBODIMENTS

Hereinafter, a liquid absorber, an ink absorbing device, and a liquid droplet ejection apparatus according to the present disclosure will be described in detail based on preferable embodiments shown in the attached drawings.

Figure 1:
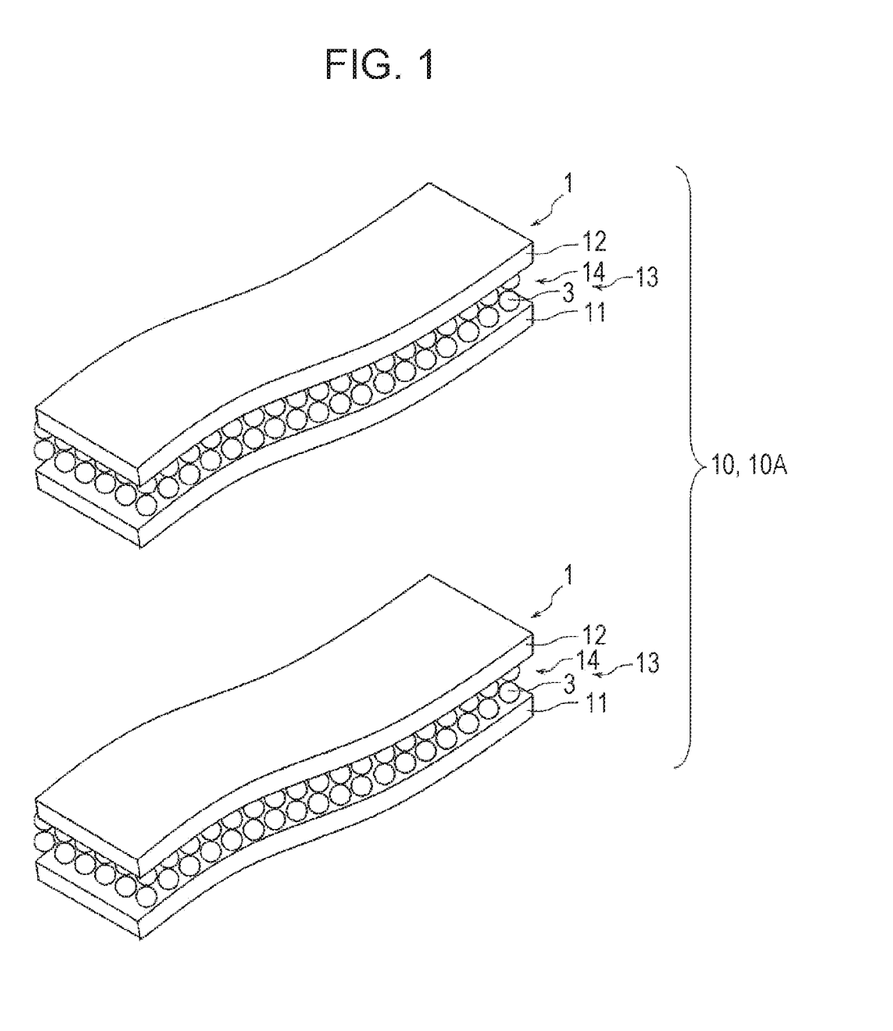
FIG. 1 is a perspective view showing the structure of a liquid absorber according to an embodiment.
Figure 2:
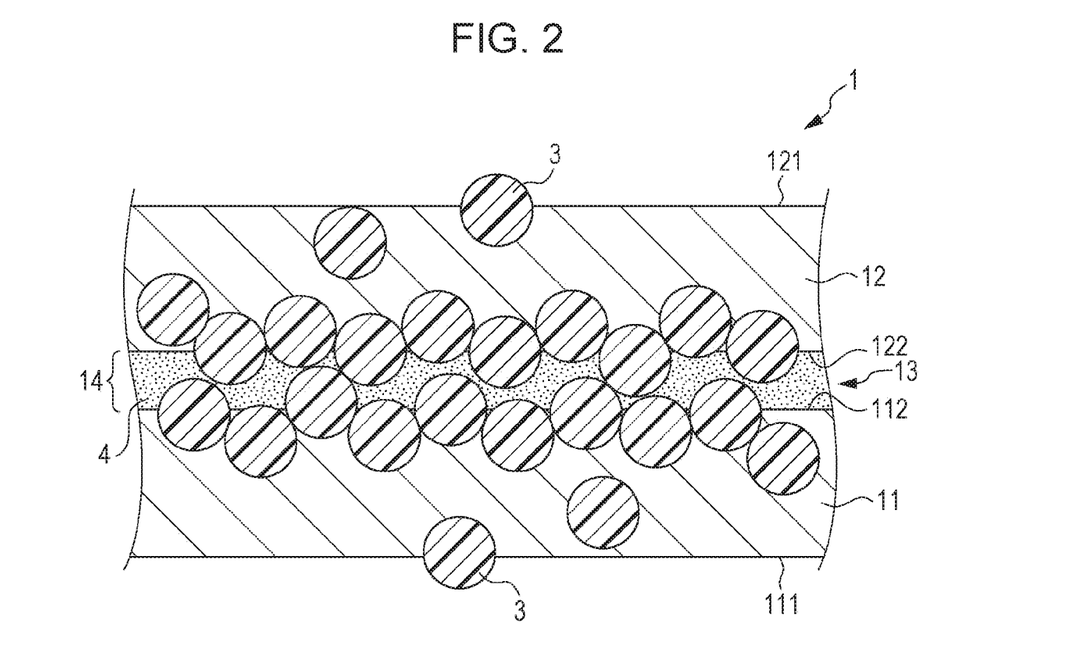
FIG. 2 is a cross-sectional view of a small part of the liquid absorber according to the embodiment.

FIG. 1 is a perspective view showing the structure of a liquid absorber according to an embodiment. FIG. 2 is a cross-sectional view of a small part included in the liquid absorber according to the embodiment.

In addition, hereinafter, for the convenience of illustration, a top side in FIG. 2 is called "above" or "an upper side", and a bottom side is called "below" or "a lower side".

As shown in FIGS. 1 and 2, a liquid absorber 10A comprises a small part aggregate 10 which includes a plurality of small parts 1, each of which has a first layer 11 containing fibers, a second layer 12 containing fibers, and a third layer 13 containing a water absorbing resin 3 and being provided between the first layer 11 and the second layer 12. That is, the liquid absorber 10A includes the small part aggregate 10 which may include various small parts but which at least includes the small parts 1 as described above.

In addition, when the water absorbing resin 3 contained in the small parts 1 is measured to obtain a TG curve in accordance with a plastic thermogravimetric measurement method defined by JIS K 7120: 1987 under measurement conditions in which a sample amount is 5 to 15 mg, a temperature increase rate is 10.0° C./min, and a measurement atmosphere is nitrogen, from the TG curve thus obtained, the ratio of a weight decrease amount of the water absorbing resin 3 at 400° C. with respect to an initial weight thereof is 0.050 to less than 0.500.

Since the water absorbing resin 3 has the thermal characteristics as described above, the liquid absorber 10A described above shows a preferable flame retardant property without adding a flame retardant agent. Hence, unlike related liquid absorbers, defects, such as degradation in liquid absorption characteristics caused by aggregation through a reaction between a flame retardant agent and a liquid, can be suppressed from being generated. That is, according to the liquid absorber 10A described above, preferable liquid absorption characteristics and a preferable flame retardant property can be simultaneously obtained.

In addition, the liquid absorber 10A as described above may also have the following effects.

In the liquid absorber 10A, when a liquid is applied to the small part aggregate 10, a large number of contacts between the small parts 1 and the liquid is not only secured but a large contact area between the small parts 1 and the liquid can also be secured. Hence, the liquid in contact with the small parts 1 is retained once by the fibers contained in the first layer 11 and the second layer 12. Subsequently, since this liquid is fed from the fibers to the water absorbing resin 3 and is then retained thereby, as the whole small part aggregate 10, the liquid absorption characteristics can be improved.

In addition, since the liquid absorber 10A is formed of the small part aggregate 10 including a plurality of the small parts 1, the shape can be arbitrarily changed. Hence, a desired amount of the liquid absorber 10A can be filled in every corner of a container which will be described later. As a result, the liquid absorption characteristics can be prevented from fluctuating.

Furthermore, since being provided between the first layer 11 and the second layer 12, the water absorbing resin 3 is not likely to escape from the small parts 1. Hence, the liquid absorber 10A is able to maintain preferable liquid absorption characteristics as described above for a long time and, in addition, is also able to suppress the water absorbing resin 3 from falling down out of the small parts 1. Accordingly, the water absorbing resin 3 can be suppressed from being unevenly distributed in the container. As a result, the liquid absorption characteristics are suppressed from fluctuating in the container, and hence, a larger amount of liquid to be absorbed can be secured.

In addition, in this specification, the "water absorption" indicates not only absorption of an aqueous ink in which a coloring material is dissolved in an aqueous solvent but also indicates absorption of all types of inks, such as a solvent-based ink in which a binder is dissolved in a solvent, an UV curable ink in which a binder is dissolved in a liquid monomer curable by UV irradiation, and a latex ink in which a binder is dispersed in a dispersing medium.

In the small part aggregate 10 as described above, since the structures of the small parts 1 are equivalent to each other, hereinafter, one small part 1 will be representatively described.

As described above, the small part 1 includes the first layer 11 containing fibers, the second layer 12 containing fibers, and the third layer 13 which contains the water absorbing resin 3 and which is provided between the first layer 11 and the second layer 12. In addition, in the liquid absorber 10A according to this embodiment, by an adhesive 4 which is provided if needed, the first layer 11 and the second layer 12 are bonded to each other, and the water absorbing resin 3 is bonded to the first layer 11 and the second layer 12. In addition, most of the first layers 11 and the second layers 12 according to this embodiment have an approximately rectangular shape when viewed in plan. In addition, "when viewed in plane" indicates that the layers are each viewed in a thickness direction of the first layer 11. In addition, when the adhesive 4 is not provided, bonding is performed by an adhesive property or a tacky property generated when water is added to the water absorbing resin 3.

As shown in FIG. 2, the water absorbing resin 3 is supported at least between the first layer 11 and the second layer 12, that is, in an interlayer 14 which is a space formed between an inner surface 112 of the first layer 11 and an inner surface 122 of the second layer 12. In addition, as shown in FIG. 2, besides the interlayer 14, the water absorbing resin 3 may also be supported by surfaces opposite to those mentioned above, that is, by a surface 111 of the first layer 11 and a surface 121 of the second layer 12. Accordingly, the liquid which reaches the small part 1 can be more efficiently absorbed. In addition, the liquid which reaches the surface 111 of the first layer 11 and the surface 121 of the second layer 12 can be rapidly permeated to the interlayer 14.

In addition, when the water absorbing resin 3 is supported by the surface 111 of the first layer 11 and the surface 121 of the second layer 12, the amount of the water absorbing resin 3 supported by the interlayer 14 may be equivalent to that by the surfaces 111 and 121 but is preferably different therefrom. That is, the amount of the water absorbing resin 3 supported by the surfaces 111 and 121 is preferably small. Accordingly, the liquid is likely to be permeated to the inner surfaces 112 and 122 from the surfaces 111 and 121. Since a relatively large amount of the water absorbing resin 3 is supported by the interlayer 14, a retention ability by the interlayer 14 is enhanced, and the liquid absorption characteristics of the liquid absorber 10A can be further improved.

Hereinafter, components of the small part 1 will be described in detail.

The first layer 11 and the second layer 12 are each a layer structural body containing fibers, such as a porous material. Hence, the first layer 11 and the second layer 12 can preferably support the water absorbing resin 3, and the water absorbing resin 3 thus supported is not likely to fall down. In addition, since the surface area is large, when the liquid is applied to the small part 1, this liquid is retained once by the fibers and is then transferred to the water absorbing resin 3; hence, the liquid absorption characteristics as the whole small part 1 is likely to be improved.

As the fibers described above, for example, there may be mentioned synthetic resin fibers, such as polyester fibers or polyamide fibers; natural resin fibers, such as cellulose fibers, keratin fibers, or fibroin fibers; or chemical modified materials thereof. Although those fibers may be used alone, or at least two types thereof may be used in combination, cellulose fibers are preferably mainly used and are more preferably used as approximately all of the fibers.

Since a cellulose is a material having a preferable hydrophilic property, when an aqueous liquid is applied to the small part 1, the liquid can be preferably incorporated therein. Hence, a particularly high viscous state, that is, a state having a viscosity of 10 mPa·s or less, can be rapidly changed into a lower viscous state, and in addition, the liquid once incorporated can be preferably fed to the water absorbing resin 3. As a result, the liquid absorption characteristics as the whole small part 1 can be significantly improved. In addition, since the cellulose generally has a high affinity to the water absorbing resin 3, the water absorbing resin 3 can be preferably supported by the surfaces of the fibers. In addition, the cellulose fibers are a regenerable natural material and, among various types of fibers, can be easily available at an inexpensive price. For example, cellulose fibers derived from waste paper are available at a relatively low cost and can contribute to the reduction in environment load. Hence, the cellulose fibers have advantages in terms of reduction in manufacturing cost of the small parts 1, stable manufacturing, reduction in environmental load, and the like.

In addition, in this specification, the cellulose fibers may be a cellulose compound, that is, a fibrous material primarily containing a cellulose in a narrow sense, and besides the cellulose, a hemicellulose and/or a lignin may also be contained.

Although not particularly limited, the average length of the fibers is preferably 0.1 to 7.0 mm, more preferably 0.1 to 5.0 mm, and further preferably 0.2 to 3.0 mm. Although not particularly limited, the average diameter of the fibers is preferably 0.05 to 2.00 mm and more preferably 0.10 to 1.00 mm.

Although not particularly limited, the average aspect ratio of the fibers, that is, the ratio of the average length to the average diameter, is preferably 10 to 1,000 and more preferably 15 to 500.

By the numerical ranges as described above, the support of the water absorbing resin 3, the retention of the liquid by the fibers, and the feed of the liquid to the water absorbing resin 3 can be more preferably performed, and the liquid absorption characteristics as the whole small part 1 can be further improved.

In addition, the average length and the average diameter of the fibers are the average values of the lengths and the diameters, respectively, of 100 fibers or more.

In addition, the conditions, such as the type of fibers, the length of the fibers, the diameter of the fibers, the aspect ratio of the fibers, and the layer thickness, may be the same or different between the first layer 11 and the second layer 12. In addition, in a method for manufacturing a liquid absorber which will be described later, since the first layer 11 and the second layer 12 are formed from the same fiber base material, those conditions described above may be equivalent to each other at a high probability. However, since the manufacturing method is not limited to that described below, the first layer 11 and the second layer 12 may be formed from fiber base materials different from each other.

Although the water absorbing resin 3 is not particularly limited as long as being a resin having a water absorbing property, for example, there may be mentioned a carboxyl methylcellulose, a poly(acrylic acid), a polyacrylamide, a starch-acrylic acid graft copolymer, a hydrolyzed starch-acrylonitrile graft copolymer, a vinyl acetate-acrylic acid ester copolymer, a copolymer of isobutylene and maleic acid, a hydrolyzed acrylonitrile copolymer or acrylamide copolymer, a poly(ethylene oxide), a poly(sulfonic acid)-based compound, or a polyglutamic acid, or a salt, a neutralized material, or a cross-linked compound of each of those mentioned above. In this case, the water absorbing property has a hydrophilic property and indicates a function to retain moisture. In addition, as the water absorbing resin 3, many resins are gelled when absorbing water.

Among those mentioned above, as the water absorbing resin 3, a resin having a functional group on its side chain is preferable. As the functional group, for example, there may be mentioned an acid group, a hydroxyl group, an epoxy group, or an amino group. In particular, the water absorbing resin 3 preferably has an acid group on its side chain and more preferably has a carboxyl group on its side chain.

As a carboxyl group-containing unit forming the side chain, for example, there may be mentioned a unit derived from a monomer, such as acrylic acid, methacrylic acid, itaconic acid, maleic acid, crotonic acid, fumaric acid, sorbic acid, cinnamic acid, or a monomer derived, for example, from an anhydride or a salt of each of those mentioned above.

When the water absorbing resin 3 having an acid group on its side chain is contained, the rate of acid groups forming salts by neutralization to the acid groups contained in the water absorbing resin 3 is preferably 30 to 100 percent by mole, more preferably 50 to 95 percent by mole, further preferably 60 to 90 percent by mole, and most preferably 70 to 80 percent by mole. Accordingly, a liquid absorbing property of the water absorbing resin 3 can be further improved.

The type of salt obtained by neutralization is not particularly limited, and for example, although an alkaline metal salt, such as a sodium salt, a potassium salt, or a lithium salt, or a salt of a nitrogen-containing basic material, such as ammonium, may be mentioned, among those mentioned above, the sodium salt is preferable. Accordingly, the liquid absorbing property of the water absorbing resin 3 can be further improved.

The water absorbing resin 3 having an acid group on its side chain is preferable since electrostatic repulsion occurs between the acid groups during ink absorption, and an absorption rate is increased. In addition, when the acid group is being neutralized, by an osmotic pressure, the liquid is likely to be absorbed in the water absorbing resin 3.

The water absorbing resin 3 may also have a structural unit containing no acid group on its side chain, and as the structural unit described above, for example, there may be mentioned a hydrophilic structural unit, a hydrophobic structural unit, or a structural unit to be used as a polymerizable cross-linking agent.

As the hydrophilic structural unit, for example, there may be mentioned a structural unit derived from a nonionic compound, such as acrylamide, methacrylamide, N-ethyl (meth)acrylamide, N-n-propyl(meth)acrylamide, N-isopropyl(meth)acrylamide, N,N-dimethyl(meth)acrylamide, 2-hydroxyethyl(meth)acrylate, 2-hydroxypropyl(meth)acrylate, methoxypolyethylene glycol(meth)acrylate, polyethylene glycol mono(meth)acrylate, N-vinylpyrrolidone, N-acryloylpiperidine, or N-acryloylpyrrolidine. In addition, in this specification, the (meth)acryl and the (meth)acrylate represent acryl or methacryl and acrylate or methacrylate, respectively.

As the hydrophobic structural unit, for example, there may be mentioned a structural unit derived from a compound, such as (meth)acrylonitrile, styrene, vinyl chloride, butadiene, isobutene, ethylene, propylene, stearyl (meth)acrylate, or lauryl (meth)acrylate.

As the structural unit to be used as a polymerizable cross-linking agent, for example, there may be mentioned a structural unit derived from diethylene glycol diacrylate, N,N-methylene bisacrylamide, a polyethylene glycol diacrylate, a polypropylene glycol diacrylate, trimethylolpropane diallyl ether, trimethylolpropane triacrylate, ally glycidyl ether, pentaerythritol triallyl ether, pentaerythritol diacrylate monostearate, bisphenol diacrylate, isocyanuric acid diacrylate, tetraallyl oxyethane, or diallyloxy acetic acid salt.

In particular, the water absorbing resin 3 preferably contains a poly(acrylic acid) salt copolymer or a cross-linked poly(acrylic acid). Accordingly, advantages, such as improvement in liquid absorption ability and reduction in manufacturing cost, are obtained.

As the cross-linked poly(acrylic acid), the rate of structural units having a carboxylic acid to the total structural units forming a molecular chain is preferably 50 percent by mole or more, more preferably 80 percent by mole or more, and further preferably 90 percent by mole or more. When the rate of the structural units having a carboxylic group is excessively small, a sufficient improvement in liquid absorption ability may be difficult to obtain in some cases.

Some of the carboxyl groups in the cross-linked poly (acrylic acid) are preferably neutralized, that is, some of the carboxyl groups are preferably neutralized into salts. The rate of the neutralized carboxyl groups to the total carboxyl groups in the cross-linked poly(acrylic acid) is preferably 30 to 99 percent by mole, more preferably 50 to 99 percent by mole, and further preferably 70 to 99 percent by mole.

In addition, the water absorbing resin 3 may also have a cross-linked structure by a cross-linking agent other the polymerizable cross-linking agent described above.

When the water absorbing resin 3 is a resin having acid groups, as the cross-linking agent, for example, a compound having a plurality of functional groups which are reactive with the acid groups may be preferably used.

When the water absorbing resin 3 is a resin having functional groups reactive with acid groups, as the cross-linking agent, a compound having a plurality of acid groups in its molecule which are reactive with the functional groups may be preferably used.

As the compound having a plurality of functional groups reactive with acid groups, for example, there may be mentioned a glycidyl ether compound, such as ethylene glycol diglycidyl ether, trimethylolpropane triglycidyl ether, a (poly)glycerin polyglycidyl ether, a diglycerin polyglycidyl ether, or propylene glycol diglycidyl ether; a polyvalent alcohol, such as a (poly)glycerin, a (poly)ethylene glycol, propylene glycol, 1,3-propanediol, a polyoxyethylene glycol, triethylene glycol, tetraethylene glycol, diethanolamine, or triethanolamine; or a polyvalent amine, such as ethylenediamine, diethylenediamine, a polyethyleneimine, or hexamethylenediamine. In addition, since functioning as a cross-linking agent by a reaction with the acid groups of the water absorbing resin 3, for example, polyvalent ions of zinc, calcium, magnesium, aluminum, or the like are also preferably used.

Although the water absorbing resin 3 may have any shape, such as a flaky shape, a needle shape, a fiber shape, or a particulate shape, most of the water absorbing resin 3 preferably has a particulate shape. When the water absorbing resin 3 has a particulate shape, the liquid permeability can be easily secured. In addition, the water absorbing resin 3 can be preferably supported by the first layer 11 and the second layer 12. In addition, the particulate shape indicates a shape having an aspect ratio, that is, the ratio of the minimum length to the maximum length, of 0.3 to 1.0. The average particle diameter of the particles is preferably 50 to 800 µm, more preferably 100 to 600 µm, and further preferably 200 to 500 µm. In addition, the average particle diameter of the particles indicates the average value obtained when the maximum lengths of 100 particles or more are measured.

In addition, the small part 1 may also include components other than those described above. As the components described above, for example, there may be mentioned a surfactant, a lubricant, a defoaming agent, a filler, a blocking inhibitor, an UV absorber, a coloring material such as a pigment or a dye, a flame retardant agent, and/or a flow improver.

In addition, as shown in FIG. 2, although the water absorbing resin 3 may be supported by the interlayer 14 formed between the first layer 11 and the second layer 12, the water absorbing resin 3 may partially intrude in the first layer 11 and the second layer 12 and may be further permeated to the surface 111 of the first layer 11 and/or the surface 121 of the second layer 12. That is, the water absorbing resin 3 may be partially impregnated in the first layer 11 from the inner surface 112 thereof and the second layer 12 from the inner surface 122 thereof and may be distributed so as to cover the fibers. Accordingly, forces of the first layer 11 and the second layer 12 supporting the water absorbing resin 3 can be increased. Hence, the water absorbing resin 3 is prevented from falling down in the container. As a result, high liquid absorption characteristics can be obtained for a long time, and in addition, the water absorbing resin 3 can be prevented from being unevenly distributed in the container; hence, the liquid absorption characteristics can be prevented from fluctuating.

In addition, in this specification, "impregnation" indicates the state in which at least some particles of the water absorbing resin 3 are permeated from the interlayer 14 into the first layer 11 and the second layer 12 and are buried therein. In addition, all the particles are not required to be impregnated. In addition, the particles of the water absorbing resin 3 may penetrate the first layer 11 and the second layer 12 by softening of the particles described above.

Figure 3:
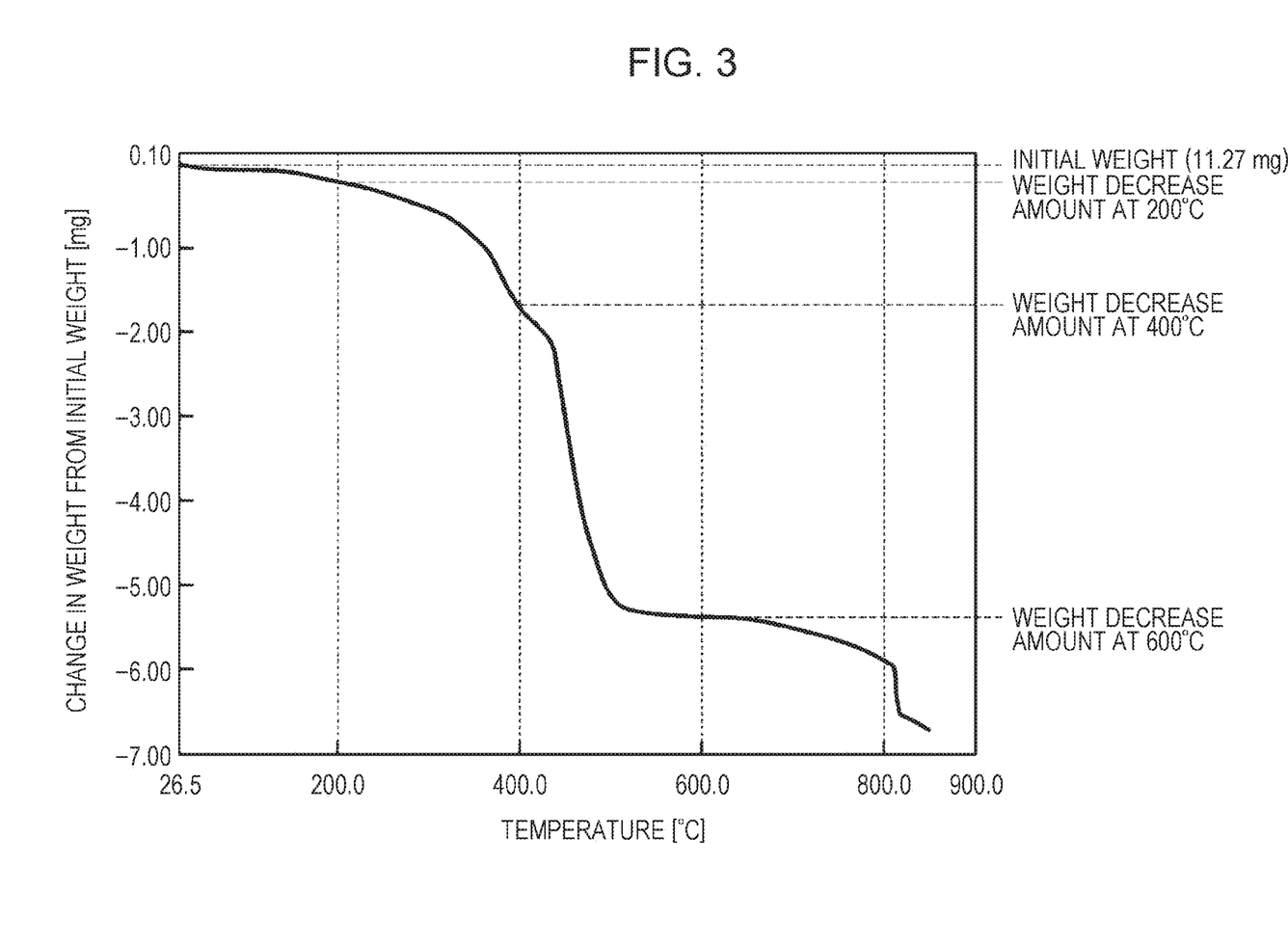
FIG. 3 is a graph showing one example of a TG curve of a water absorbing resin contained in the small part shown in FIGS. 1 and 2.

In addition, FIG. 3 is a graph showing one example a TG curve of the water absorbing resin 3 contained in the small part 1 shown in FIGS. 1 and 2.

The TG curve shown in FIG. 3 is a curve measured in accordance with a plastic thermogravimetric measurement method defined by JIS K 7120: 1987 under measurement conditions in which a sample amount is 5 to 15 mg, a temperature increase rate is $10.0°$ C./min, and a measurement atmosphere is nitrogen. Hence, this TG curve is a curve in which when the temperature of the sample having the mass described above is continuously increased at the above temperature increase rate in the above measurement atmosphere, the change in mass of the sample is plotted along a vertical axis, and the time is plotted along a horizontal axis. In addition, the vertical axis in FIG. 3 is set so that a decrease in amount is increased along a direction toward a lower side. Hence, since the mass decrease is generated by decomposition, evaporation, and the like of the sample in association with the increase in temperature, the TG curve shown in FIG. 3 is a curve in which the change is shown along the direction toward the lower side.

In the TG curve of the water absorbing resin 3 according to this embodiment obtained as described above, the weight of the sample is measured at $400°$ C. In addition, according to this water absorbing resin 3, when the ratio of the weight decrease amount of the sample at $400°$ C. with respect to the initial weight thereof is measured, a ratio of 0.050 to 0.500 is satisfied. Since the weight decrease amount of the water absorbing resin 3 as described above is relatively small from ordinary temperature to $400°$ C., the decomposition amount thereof is limited. Hence, although being heated, the water absorbing resin 3 as described above is suppressed from being seriously thermally decomposed from ordinary temperature to $400°$ C. That is, the water absorbing resin 3 as described above can be regarded, in this temperature range, to obtain a higher self-extinguishing property by heat absorption.

Hence, the liquid absorber 10A including the small parts 1 which contain the water absorbing resin 3 as described above shows a preferable flame retardant property. For example, when the fibers contained in the first layer 11 and the second layer 12 are cellulose fibers, although the cellulose fibers themselves start combustion at approximately 300° C. to 400° C., since the water absorbing resin 3 is supported by the cellulose fibers, the combustion start temperature thereof can be increased. Accordingly, since the first layer 11 and the second layer 12 are not likely to be combusted, as a result, the flame retardant property of the liquid absorber 10A can be improved.

In addition, in the TG curve of the water absorbing resin 3, the ratio of the weight decrease amount at 400° C. with respect to the initial weight is preferably 0.050 to less than 0.400 and more preferably 0.075 to less than 0.350. When this ratio is less than the lower limit described above, although the flame retardant property is further improved, in some cases, the water absorption characteristics of the water absorbing resin 3 may be degraded, and/or the water absorbing resin 3 may not be easily handled. On the other hand, when this ratio is more than the upper limit described above, since serious thermal decomposition occurs in the temperature range described above, the flame retardant property may be degraded in some cases.

As described above, the liquid absorber 10A is formed of the small part aggregate 10 including the small parts 1 each having the first layer 11 containing fibers, the second layer 12 containing fibers, and the third layer 13 containing the water absorbing resin 3 and being provided between the first layer 11 and the second layer 12. In addition, as described above, the water absorbing resin 3 is a resin which satisfies that, in the TG curve measured in accordance with a plastic thermogravimetric measurement method defined by JIS K 7120: 1987 under measurement conditions in which a sample amount is 5 to 15 mg, a temperature increase rate is 10.0° C./min, and a measurement atmosphere is nitrogen, the ratio of the weight decrease amount of the water absorbing resin 3 at 400° C. with respect to the initial weight thereof is 0.050 to less than 0.500.

The liquid absorber 10A as described above simultaneously achieves preferable liquid absorption characteristics and flame retardant property. In addition, since this flame retardant property is believed to be primarily generated in accordance with the thermogravimetric characteristics of the water absorbing resin 3, the use of the flame retardant agent may be not required, or the amount thereof to be used may be decreased. Hence, while the safety of the liquid droplet ejection apparatus 200 is improved, the amount of the flame retardant agent to be used can be decreased, and an adverse side-effect caused by the use of the flame retardant agent can be suppressed.

In addition, in the TG curve of the water absorbing resin 3, the ratio of the weight decrease amount with respect to the initial weight is preferably 0.001 to less than 0.080, more preferably 0.005 to less than 0.045, and further preferably 0.010 to less than 0.040. This ratio indicates that, for example, even at a lower temperature than the combustion temperature of natural fibers, such as cellulose fibers, the weight decrease of the water absorbing resin 3 is significantly small. Hence, the water absorbing resin 3 having the ratio as described above is suppressed from being thermally decomposed not only in a temperature range of 200° C. to 400° C. but also in a temperature range of less than 200° C. As a result, the flame retardant property of the liquid absorber 10A can be further improved.

In addition, in the TG curve of the water absorbing resin 3 described above, although not particularly limited, the ratio of the weight decrease amount at 600° C. to the initial weight is set, for example, to 0.500 or more and preferably to less than 0.700. Accordingly, a liquid absorber 10A which simultaneously achieves more preferable liquid absorption characteristics and flame retardant property can be obtained.

In addition, in the small part 1, the ratio of the total weight of the water absorbing resin 3 with respect to the total weight of the fibers is preferably 0.15 to 1.75, more preferably 0.20 to 1.50, and further preferably 0.25 to 1.20. Accordingly, while the permeability by the fibers of the first layer 11 and the second layer 12 is sufficiently improved, a sufficient absorbing property of the water absorbing resin 3 can be secured. As a result, the liquid absorption characteristics of the liquid absorber 10A can be significantly improved.

In addition, when this ratio is lower than the above lower limit, the absorbing property and the flame retardant property of the water absorbing resin 3 may be unfavorably degraded in some cases. On the other hand, when this ratio is more than the above upper limit, since the amount of the water absorbing resin 3 is relatively excessive, the expansion coefficient of the small part 1 in association with the liquid absorption is increased, and the liquid permeability may be degraded in some cases.

In addition, if needed, the liquid absorber 10A may also contain an adhesive 4. By the adhesive 4, the first layer 11 and the second layer 12 are bonded to each other at the interlayer 14, and in addition, the water absorbing resin 3 particles are bonded to each other, and the water absorbing resin 3 is bonded to the first layer 11 and the second layer 12. Accordingly, the first layer 11 and the second layer 12 are bonded to each other by a sufficient bonding force, and as a result, the water absorbing resin 3 is further not likely to fall down.

In addition, the bonding by the adhesive 4 may be replaced with bonding by an adhesive property and/or a tacky property generated by softening of the water absorbing resin 3 caused by contact thereof with a liquid containing water during the manufacturing of the small part 1. That is, the function of the adhesive 4 may be replaced by the addition of water.

When the bonding is performed by a method other than the addition of water, the adhesive 4 is not particularly limited, and although a water-soluble adhesive, an organic-based adhesive, or the like may be used, among those mentioned above, the water-soluble adhesive is preferable. Accordingly, when the liquid is an aqueous liquid, even if the water-soluble adhesive comes into contact with the surface of the water absorbing resin 3, sine the water-soluble adhesive is dissolved upon the contact with the liquid, the liquid absorption by the water absorbing resin 3 can be prevented from being inhibited by the water-soluble adhesive.

When the water-soluble adhesive is used as the adhesive 4, as the water-soluble adhesive, for example, there may be mentioned proteins, such as a casein, a soybean protein, and a synthetic protein; various starches, such as a starch and an oxidized starch; poly(vinyl alcohol)s, such as a poly(vinyl alcohol), a cationic poly(vinyl alcohol), and a silyl-modified poly(vinyl alcohol); cellulose derivatives, such as a carboxymethyl cellulose and a methyl cellulose; an aqueous polyurethane resin, and an aqueous polyester resin.

Among those adhesives, in view of a surface strength, the polyvinyl alcohol) is preferably used. Accordingly, the bonding force among the first layer 11, the second layer 12, and the water absorbing resin 3 can be sufficiently improved.

In addition, since the type of adhesive is selected in accordance with the type of liquid to be absorbed, regardless of the type of liquid, the effect described above can be obtained.

The content of the adhesive 4 in the small part 1 with respect to the fibers is preferably 1.0 to 70.0 percent by weight and more preferably 2.5 to 50.0 percent by weight. Accordingly, the effect of the adhesive 4 can be more significantly obtained. When the content of the adhesive 4 is excessively small, the effect of the adhesive 4 may not be sufficiently obtained in some cases. On the other hand, when the content of the adhesive 4 is excessively large, the force for supporting the water absorbing resin 3 may not be further improved in some cases.

Although the shape of the small part 1 is not particularly limited, the small part 1 shown in FIG. 1 has a long rectangular shape. In addition, the small part 1 preferably has a flexible property. Hence, the small parts 1 are each likely to be deformed. When the small part aggregate 10 containing those small parts 1 is received in a container, since the small parts 1 are deformed regardless of the inside shape of the container, the whole small part aggregate 10 can be smoothly received in the container. In addition, a contact area between the whole small part aggregate 10 and the liquid can be secured as much as possible, and hence, the absorption characteristics absorbing the liquid are improved.

In addition, the small part 1 shown in FIG. 1 has a thin plate shape in which the thickness is smaller than any of the side lengths of the primary surface. That is, the small part 1 has a plate shape having two primary surfaces in a front-rear relationship.

When the area of the primary surface of the small part 1 is represented by a [mm$^2$], and the thickness of the small part 1 in a direction normal to this primary surface is represented by b [mm], the small part 1 preferably satisfies the relationships of $a^{1/2}/b > 5.0$ and $0.05 \leq b \leq 10.0$.

Accordingly, the small part 1 is defined so that the primary surface is sufficiently long and thin, and the thickness is set in the predetermined range. Hence, the bulk density of the small part aggregate 10 can be appropriately increased, and in addition, the small part 1 can appropriately support the water absorbing resin 3, retain the liquid by the fibers, and/or feed the liquid to the water absorbing resin 3. As a result, the liquid absorption characteristics as the whole small part aggregate 10 can be further improved. Furthermore, the small part aggregate 10 can be easily deformed as a whole, and hence, the shape followability thereof to the container is excellent.

In addition, the small part 1 more preferably satisfies the relationships of $a^{1/2}/b > 5.3$ and $0.10 \leq b \leq 8.0$.

In addition, as described above, the primary surfaces of the small part 1 each preferably have a long and thin shape. When being received in the container, the small parts 1 are likely to be filled therein so that extension directions thereof are different from each other.

In the receiving state as described above, voids are likely to be formed between the small parts 1. Accordingly, the liquid may pass through the voids or may wet-spread by a capillary phenomenon when the voids are small. That is, the liquid permeability can be secured. Accordingly, the liquid flowing down toward the lower side of the container is prevented from being stopped, and hence, the liquid can be rapidly permeated to the bottom of the container. Hence, the liquid can be appropriately absorbed by the small part 1 and can be retained for a long time.

In addition, as the whole small part aggregate 10, the number of contacts with the liquid is increased, and hence, the absorption ability absorbing the liquid is improved.

In addition, as described above, the shape of the small part aggregate 10 is likely to be arbitrarily changed. Accordingly, a small part aggregate 10 having a desired amount can be received in the container, and in addition, for example, the bulk density thereof can be easily adjusted. As a result, the liquid absorption characteristics can be prevented from fluctuating.

In addition, in the small part aggregate 10, at least one small part 1 having a different size and shape may also be contained. In addition, although various small parts may be contained in the liquid absorber 10A, the rate of the number of the small parts 1 according to this embodiment to that of all the small parts is preferably 10% or more and more preferably 50% or more.

In addition, in the two primary surfaces having a front-rear relationship of the small part 1, although depending on the shape and the size of the container, the longest line component of the primary surface, that is, the length along the long axis of the small part 1, is, for example, preferably 0.5 to 200 mm, more preferably 1 to 100 mm, and further preferably 2 to 30 mm.

In addition, in the primary surfaces of the small part 1, although depending on the shape and the size of the container, the longest line component in a direction orthogonal to the long axis described above, that is, the length along the short axis of the small part 1, is, for example, preferably 0.1 to 100 mm, more preferably 0.3 to 50 mm, and further preferably 1 to 20 mm.

According to the numerical ranges described above, the support of the water absorbing resin 3, the retention of the liquid by the fibers, and the feed of the liquid to the water absorbing resin 3 can be more preferably performed, and the liquid absorption characteristics as the whole small parts 1 can be further improved. Furthermore, the whole small part aggregate 10 is likely to be deformed, and hence the shape followability to the container is excellent.

In addition, in the small part aggregate 10, although all the small parts 1 are not required to satisfy the numerical ranges described above, at least 1% of the number of the small parts 1 preferably satisfies the numerical ranges described above, and at least 10% thereof more preferably satisfies the numerical ranges described above.

In addition, the bulk density of the small part aggregate 10 before the liquid is absorbed is preferably 0.01 to 0.5 g/cm$^3$ and more preferably 0.03 to 0.3 g/cm$^3$, and among those mentioned above, a bulk density of 0.05 to 0.2 g/cm$^3$ is particularly preferable. Accordingly, the liquid retention property and the liquid permeability can be simultaneously obtained.

When the bulk density of the small part aggregate 10 is excessively low, the content of the water absorbing resin 3 tends to decrease, and the liquid retention property may be insufficient in some cases. On the other hand, when the bulk density of the small part aggregate 10 is excessively large, the voids between the small parts 1 cannot be sufficiently secured, and the liquid permeability may be insufficient in some cases.

In addition, since the small part 1 is flexible and deformable, the bulk density of the small part aggregate 10 can be easily and appropriately adjusted, so that the bulk density as described above can be obtained.

The above liquid absorber 10A has the preferable flame retardant property as described above, and the flame retardant property thereof can be evaluated by the HB test of the UL 94 Standard. The HB test of the UL 94 Standard is a test to investigate the degree of combustion of a test piece in such a way that a test piece having a width of 13.0 mm and a length of 125 mm is held at one end thereof in a horizontal direction, and a flame of a gas burner is applied to the other end of the test piece for 30 seconds. In addition, the test piece is left in advance at a temperature of 23° C. and a relative humidity of 50% for 48 hours. In addition, the height of the flame of the gas burner is set to 20 mm, and the angle of the gas burner is set to 45°. In addition, at positions of the test piece 25 mm and 100 mm apart, respectively, from the end thereof to which the flame is applied, that is, from the other end described above, two marked lines are drawn. In addition, a region between the two marked lines is called a combustion region.

In the flame retardant evaluation as described above, the liquid absorber 10A according to this embodiment shows a superior flame retardant property to that in the past. In this evaluation of the flame retardant property, a combustion rate obtained from the following equation is used.

Combustion rate (mm/min)=length of combustion region (mm)/combustion time in combustion region (min)

In addition, when the thickness of the test piece is less than 3.0 mm, a combustion rate of 75 mm/min or less is evaluated as OK. In addition, when the thickness of the test piece is 3.0 to 13.0 mm, a combustion rate of 40 mm/min or less is evaluated as OK.

The liquid absorber 10A according to this embodiment shows a superior flame retardant property to that in the past and has an excellent flame retardant property so as to pass the HB test of this UL 94 Standard.

Next, a method for manufacturing the liquid absorber 10A will be described.

FIGS. 4 to 7 are schematic views each illustrating a step of a method for manufacturing the small parts shown in FIGS. 1 and 2.

This manufacturing method comprises a disposing step, a water absorbing-resin applying step, a bending step, and a heat pressing step.

Figure 4:
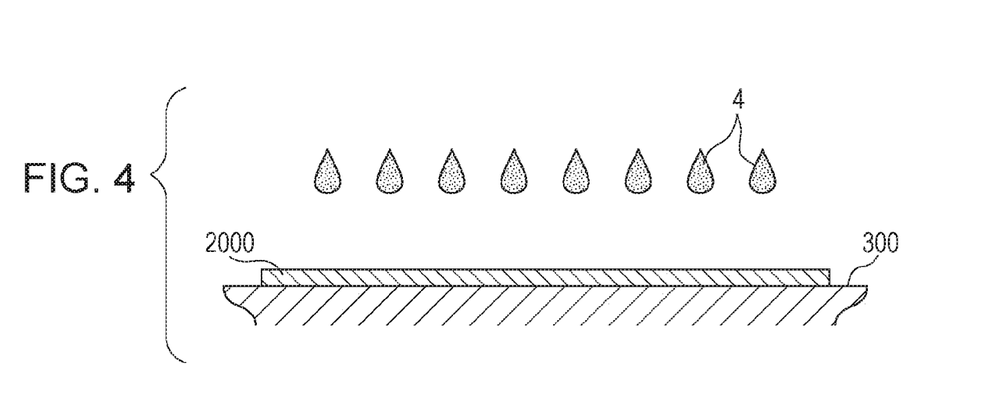
FIG. 4 is a schematic view illustrating one step of a method for manufacturing the small parts shown in FIGS. 1 and 2.

First, as the disposing step, as shown in FIG. 4, a sheet-shaped fiber base material 2000 is disposed on a placing table 300.

Next, as the water absorbing-resin applying step, first, if needed, the adhesive 4 in the form of a liquid is applied to the sheet-shaped fiber base material 2000 from one surface side thereof. As this applying method, for example, there may be mentioned a spray coating or a method in which after the adhesive 4 is permeated in a spongy roller, this spongy roller is rotated on one surface of the sheet-shaped fiber base material 2000.

Figure 5:
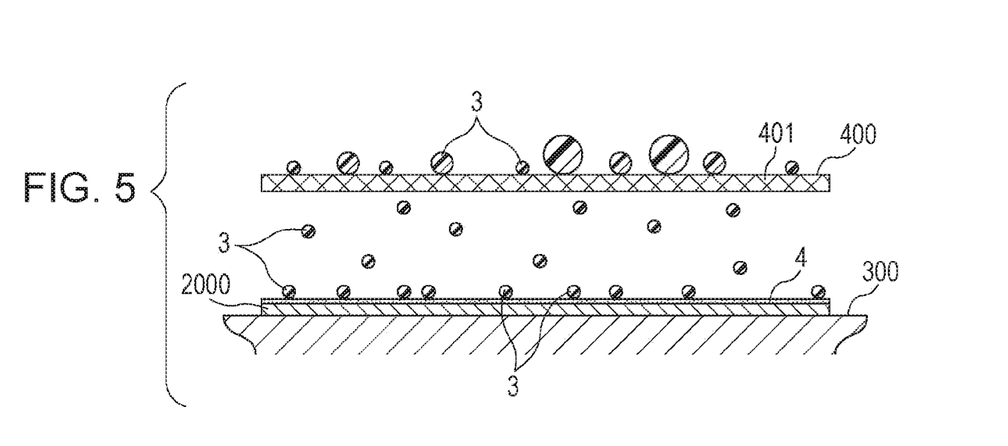
FIG. 5 is a schematic view illustrating another step of the method for manufacturing the small parts shown in FIGS. 1 and 2.

Next, as shown in FIG. 5, the water absorbing resin 3 is applied onto one surface of the sheet-shaped fiber base material 2000 through a mesh member 400. Since the mesh member 400 has meshes 401, particles of the water absorbing resin 3 larger than the meshes 401 are trapped on the mesh member 400, and on the other hand, particles smaller than the meshes 401 are applied on the one surface of the sheet-shaped fiber base material 2000 through the meshes 401.

Since the mesh member 400 is used as described above, the water absorbing resin 3 thus applied can be smoothly made to have uniform particle diameters. Hence, the liquid absorbing property can be prevented from fluctuating in the fiber base material 2000.

In addition, although the adhesive 4 described above may be applied if needed, after the water absorbing resin 3 is applied, by addition of water to the water absorbing resin 3, an adhesive property or a tacky property generated therein may be used instead of using the adhesive 4.

The addition of water may be performed, for example, using a spray device.

Figure 6:
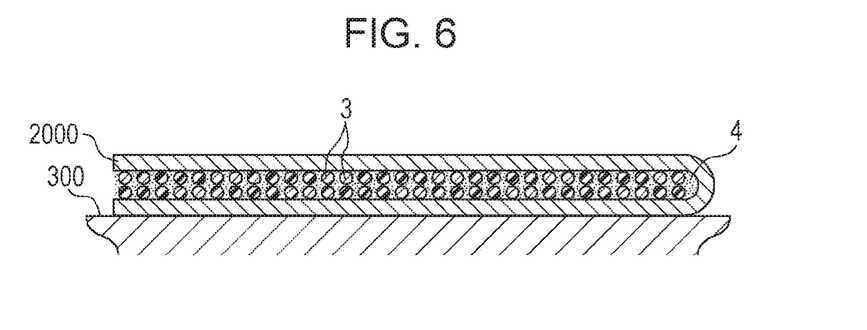
FIG. 6 is a schematic view illustrating another step of the method for manufacturing the small parts shown in FIGS. 1 and 2.

Next, as the bending step, as shown in FIG. 6, the sheet-shaped fiber base material 2000 processed through the disposing step and the water absorbing-resin applying step is folded into two portions. In this step, the fiber base material 2000 is folded into the two portions so that two parts of the surface thereof to which the water absorbing resin 3 is applied face each other.

Figure 7:
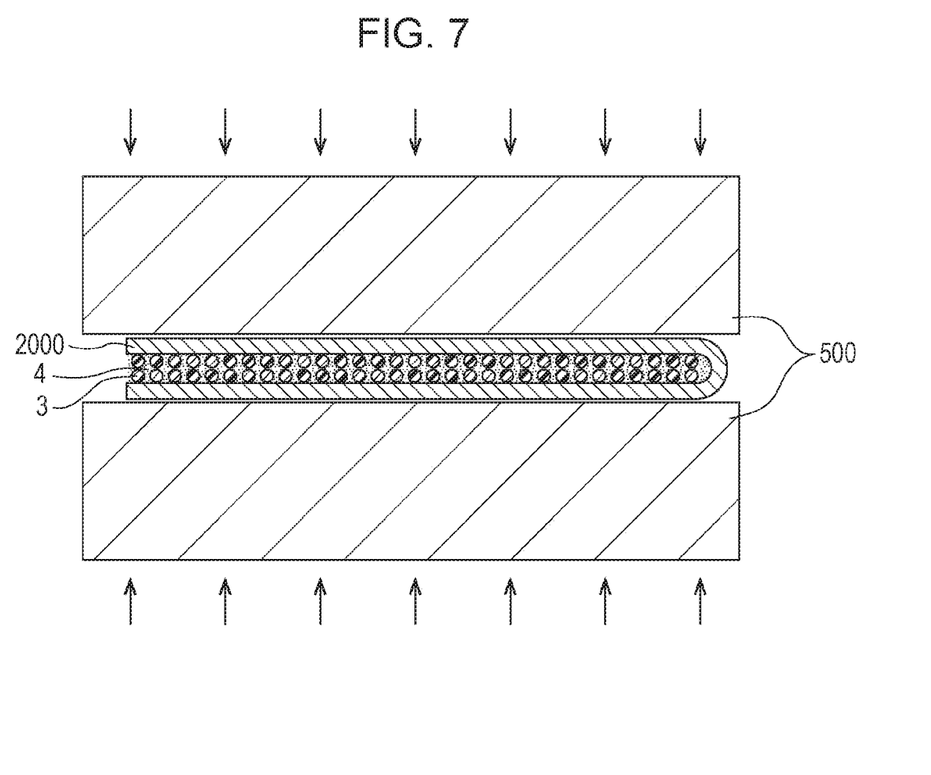
FIG. 7 is a schematic view illustrating another step of the method for manufacturing the small parts shown in FIGS. 1 and 2.

Next, as shown in FIG. 7, the folded sheet-shaped fiber base material 2000 is disposed between a pair of heating blocks 500. In addition, as the heat pressing step, the pair of heating blocks 500 is heated, and in addition, by moving the pair of heating blocks 500 to decrease the distance therebetween, the pressure is applied so as to press the fiber base material 2000 in the thickness direction thereof. Accordingly, the water absorbing resin 3 is softened by the heating, and in addition, the water absorbing resin 3 intrudes in the fiber base material 2000 by the pressure application, and some particles of the resin 3 pass through the fiber base material 2000.

A pressing force in this step is preferably 0.1 to 1.0 kg/cm$^2$ and more preferably 0.2 to 0.8 kg/cm$^2$. In addition, a heating temperature in this step is preferably 80° C. to 160° C. and more preferably 100° C. to 120° C.

Subsequently, when the heat application and the pressure application are released, the water absorbing resin 3 intruding in the fiber base material 2000 is bonded thereto and is impregnated therein, and in addition, the two parts of the fiber base material 2000 thus folded are bonded to each other with the water absorbing resin 3 or the adhesive 4 interposed therebetween.

Next, if needed, the folded sheet-shaped fiber base material 2000 is finely cut, coarsely pulverized, and/or crushed by a pair of scissors, a cutter, a mill, a shredder, and the like or is finely torn by hands into pieces. Accordingly, the small parts 1 are obtained, and hence, the small part aggregate 10 formed of the small parts 1 is obtained.

In addition, after a desired amount of the small part aggregate 10 is measured, while the bulk density thereof is adjusted, for example, by disentangling the small part aggregate 10 by hands, the small part aggregate 10 is received in a desired container. As a result, a liquid absorbing device receiving the liquid absorber 10A in the container is obtained.

According to the manufacturing method described above, after the water absorbing resin 3 is applied to one fiber base material 2000, by a simple folding method, the structure in which the two parts of the fiber base material 2000 are laminated to each other can be formed. That is, a step of spraying the water absorbing resin 3 onto two fiber base materials 2000 can be omitted. Hence, the manufacturing step can be simplified.

Furthermore, in the heat pressing step, of the surfaces of the fiber base material 2000, the surface thereof in contact with the heating blocks 500 is a surface to which the water absorbing resin 3 is not so much applied, and hence, the water absorbing resin 3 is suppressed from adhering to the heating blocks 500. Accordingly, a washing step of washing the heating blocks 500 may be omitted, or the number of the washing steps may be reduced, so that the productivity is improved.

Heretofore, the liquid absorber 10A has been described, and next, an ink absorbing device 100 which includes the liquid absorber 10A and a liquid droplet ejection apparatus 200 will be described.

Figure 8:
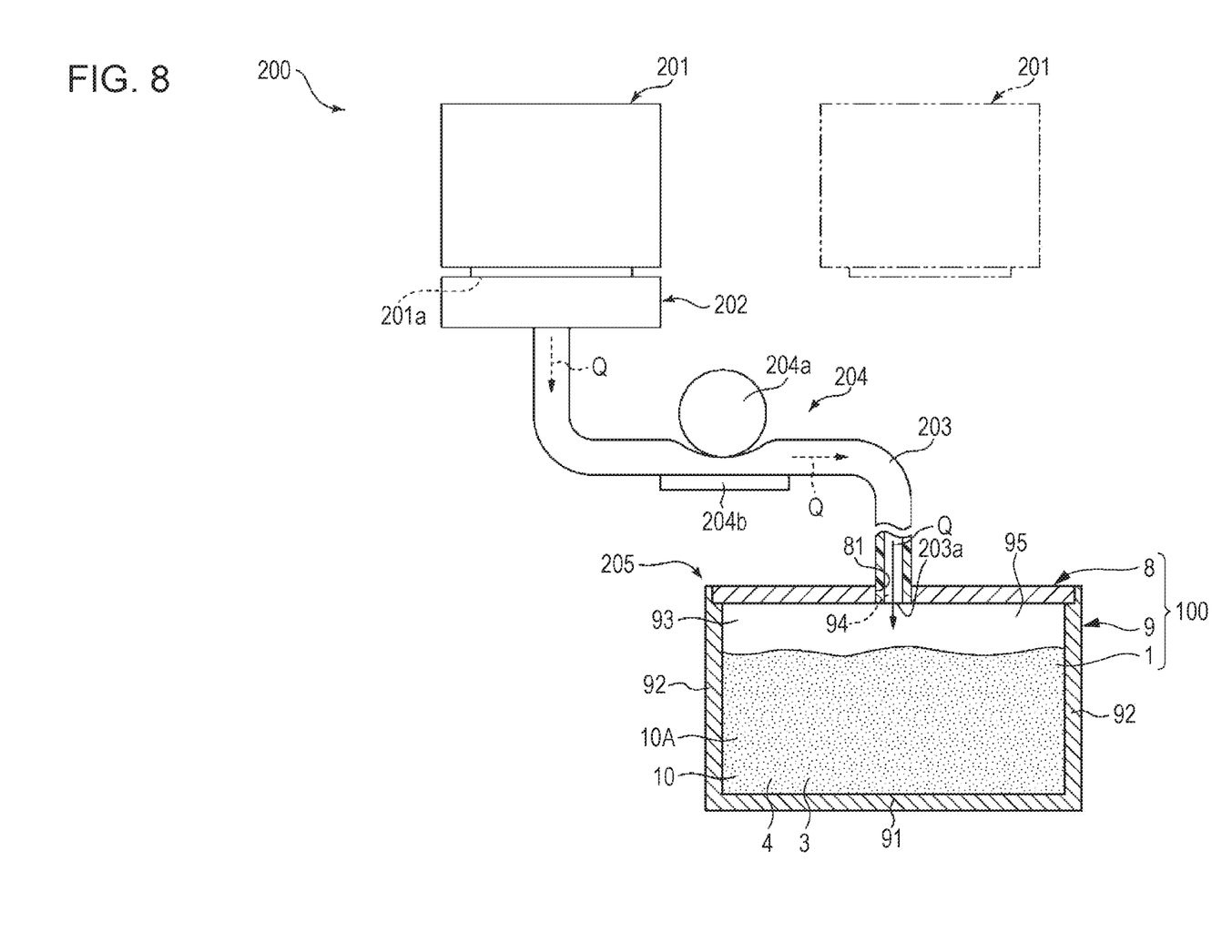
FIG. 8 is a partially vertical cross-sectional view showing a liquid droplet ejection apparatus according to another embodiment and an ink absorbing device according to still another embodiment.

FIG. 8 is a partially vertical cross-sectional view showing a liquid droplet ejection apparatus according to another embodiment and an ink absorbing device according to still another embodiment. In addition, hereinafter, for the convenience of illustration, a top side in FIG. 8 is called "above" or "upper side", and a bottom side in FIG. 8 is called "below" or "lower side".

The ink absorbing device 100 shown in FIG. 8 includes the liquid absorber 10A and a container 9 receiving the liquid absorber 10A. Accordingly, an ink absorbing device 100 capable of obtaining the effect of the liquid absorber 10A described above can be obtained. That is, an ink absorbing device 100 which simultaneously obtains preferable liquid absorption characteristics and flame retardant property can be obtained.

The liquid droplet ejection apparatus 200 shown in FIG. 8 is, for example, an ink jet-type color printer. This liquid droplet ejection apparatus 200 includes a recovery portion 205 recovering a waste liquid of an ink Q which is one example of the liquid, and as this recovery portion 205, the ink absorbing device 100 is used. Accordingly, the liquid droplet ejection apparatus 200 capable of obtaining the effect of the ink absorbing device 100 described above can be achieved. That is, there can be obtained a liquid droplet ejection apparatus 200 which includes the ink absorbing device 100 simultaneously having preferable liquid absorption characteristics and flame retardant property and which is excellent in reliability and safety.

This liquid droplet ejection apparatus 200 includes an ink ejection head 201 ejecting the ink Q, a capping unit 202 preventing clogging of nozzles 201a of the ink ejection head 201, a tube 203 connecting the capping unit 202 to the ink absorbing device 100, a roller pump 204 feeding the ink Q from the capping unit 202, and the recovery portion 205.

The ink jet head 201 has a plurality of the nozzles 201a ejecting the ink Q to a lower side. This ink ejection head 201 is able to perform printing by ejecting the ink Q while moving with respect to a recording medium, such as paper.

When the ink ejection head 201 is placed at a waiting position, the capping unit 202 sucks the nozzles 201a collectively by the operation of the roller pump 204 to prevent the clogging of the nozzles 201a.

The tube 203 is a pipe line feeding the ink Q sucked through the capping unit 202 to the ink absorbing device 100. This tube 203 is flexible.

The roller pump 204 is disposed at a certain portion of the tube 203 and includes a roller portion 204a and a pinching portion 204b which pinches the portion of the tube 203 with the roller portion 204a. When the roller portion 204a is rotated, a suction force is generated in the capping unit 202 through the tube 203. In addition, since the roller portion 204a is continuously rotated, the ink Q adhering to the nozzle 201a can be fed to the recovery portion 205.

In the recovery portion 205, the ink absorbing device 100 in which the liquid absorber 10A is received is provided, and the ink Q is fed to the ink absorbing device 100 and then absorbed as a waste liquid by the small part aggregate 10 in the ink absorbing device 100.

As shown in FIG. 8, the ink absorbing device 100 includes the liquid absorber 10A, the container 9 receiving the liquid absorber 10A, and a lid 8 sealing the container 9.

This ink absorbing device 100 is detachably fitted to the liquid droplet ejection apparatus 200 and, in the state described above, is used for waste liquid absorption of the ink Q as described above. As described above, the ink absorbing device 100 may be used as a so-called "waste ink tank". In addition, when the absorption amount of the ink Q in the ink absorbing device 100 reaches the limit, this ink absorbing device 100 can be replaced with a new and unused ink absorbing device 100. In addition, whether the absorption amount of the ink Q in the ink absorbing device 100 reaches the limit or not can be detected by a detection portion in the liquid droplet ejection apparatus 200. In addition, when the absorption amount of the ink Q in the ink absorbing device 100 reaches the limit, this limit state is noticed by a notice portion, such as a monitor, embedded in the liquid droplet ejection apparatus 200.

The container 9 receives the liquid absorber 10A. This container 9 has a box shape having, for example, a square bottom portion 91 when viewed in plan and four side wall portions 92 standing upward from the respective sides of the bottom portion 91. In addition, in a receiving space 93 surrounded by the bottom portion 91 and the four side wall portions 92, the liquid absorber 10A formed of the small part aggregate 10 is received.

In addition, the container 9 is not limited to that having the square bottom portion 91 when viewed in plan and may have a cylindrical shape as a whole having a round bottom portion 91 when viewed in plan.

The container 9 may be flexible but is preferably hard. When an inside pressure or an external pressure is applied to a hard container 9, this container has a shape retention property so that the volume thereof is not changed by 10% or more. Accordingly, after the small parts 1 of the liquid absorber 10A absorb the ink Q, even when a force generated by the expansion is applied to the container 9 from the inside thereof, the shape of the container 9 itself can be retained. Hence, the state of the container 9 installed in the liquid droplet ejection apparatus 200 is stabilized, and the small parts 1 can stably absorb the ink Q.

In addition, although the container 9 may be formed from any material as long as the ink Q is not allowed to pass therethrough, for example, various resin materials, such as a cyclic polyolefin or a polycarbonate, may be used. In addition, as the material for the container 9, besides the various resin materials mentioned above, for example, various metal materials, such as aluminum and stainless steel, may also be used.

In addition, since being transparent or semi-transparent, the container 9 is formed to have internal visibility, but the container 9 may also be opaque.

The ink absorbing device 100 includes the lid 8 sealing the container 9. As shown in FIG. 8, the lid 8 has a plate shape and is engaged with an upper opening portion 94 of the container 9. By this engagement, the upper opening portion 94 can be sealed in a liquid-tight manner. Hence, for example, after being discharged from the tube 203 to fall down, even when the ink Q splashes up by collision with the small part aggregate 10, the ink Q can be prevented from being scattered outside. Accordingly, the ink Q can be prevented from contaminating the periphery of the ink absorbing device 100 by adhesion thereto.

At a central portion of the lid 8, a connection port 81 to be connected to the tube 203 is formed. The connection port 81 is formed of a through-hole penetrating the lid 8 in a thickness direction thereof. In addition, a downstream-side end portion of the tube 203 is provided in this connection port 81. In addition, in this case, an exhaust port 203a of the tube 203 faces a lower side.

In addition, for example, radial ribs or grooves may be formed in the lower surface of the lid 8 around the connection port 81. The ribs and the grooves each function as a restriction portion to restrict the flow direction of the ink Q in the container 9.

In addition, the lid 8 may also have an absorbing property of absorbing the ink Q or a repellent property of repelling the ink Q.

Although not particularly limited, the thickness of the lid 8 is, for example, preferably 1 to 20 mm and more preferably 8 to 10 mm. In addition, the lid 8 is not limited to a plate shape having the numerical range as described above and may have a film shape thinner than that described above. In this case, although not particularly limited, the thickness of the lid 8 is, for example, preferably 10 μm to less than 1 mm.

The liquid absorber 10A received in the container 9 includes the small part aggregate 10. The small part aggregate 10 includes a plurality of flexible small parts 1, and in this embodiment, the small parts 1 are used after being collectively received in the container 9.

The number of the small parts 1 received in the container 9 is not particularly limited, and for example, in accordance with various conditions, such as the application of the ink absorbing device 100, an appropriate number may be selected. Depending on the number of the small parts 1 to be received, the maximum absorbing amount of the ink Q in the ink absorbing device 100 may be adjusted.

In addition, when the volume of the receiving space 93 of the container 9 is represented by V1, and the total volume of the small part aggregate 10 before the ink Q is absorbed is represented by V2, the ratio of V2 to V1, that is, V2/V1, is preferably 0.1 to 0.7 and more preferably 0.2 to 0.7. Accordingly, in the container 9, voids 95 are formed. Although the small parts 1 expands when absorbing the ink Q, the voids 95 function as a buffer when the small parts 1 expands. Hence, the small parts 1 can sufficiently expand and can sufficiently absorb the ink Q.

Heretofore, although the liquid absorber, the ink absorbing device, and the liquid droplet ejection apparatus of the present disclosure have been described with reference to the embodiments shown in the drawings, the present disclosure is not limited thereto, and individual portions forming the liquid absorber and the ink absorbing device may be replaced with arbitrary portions capable of achieving the functions similar to those described above. In addition, an arbitrary structural member may also be added.

In addition, the liquid absorber of the present disclosure may be used for, besides an ink absorbing application, any applications absorbing a liquid.

In addition, although the ink absorbing device according to the above embodiments is used as the "waste ink tank", the ink absorbing device of the present disclosure is not limited thereto, and for example, may be used as an "ink leakage receiving container" absorbing an ink unintentionally leaked from an ink flow path of the liquid droplet ejection apparatus.

EXAMPLES

Next, concrete examples of the present disclosure will be described.

Example 1

[1] Manufacturing of Liquid Absorber

First, as a sheet-shaped fiber base material, G80A4W manufactured by Toppan Forms Co., Ltd., which was paper, having a length of 30 cm, a width of 22 cm, and a thickness of 0.5 mm was prepared. Fibers contained in this paper had an average length of 0.71 mm, an average width of 0.2 mm, and an aspect ratio of 3.56, which was defined by the average length/average width. In addition, the weight of the paper was 4 g/one paper. In addition, as the paper, paper on which no printing was performed using a toner was used.

Next, 2 cc of purified water was sprayed onto this paper from one side thereof.

Next, as a partial sodium salt of a cross-linked poly (acrylic acid), which was a water absorbing resin having a carboxyl group as an acid group on its side chain, Sanfresh ST-500MPSA manufactured by Sanyo Chemical Industries, Ltd., was applied to the one side of the paper to which the water was sprayed. In this step, the water absorbing resin was applied while being sieved, in particular, using JTS-200-45-106 manufactured by Tokyo Screen Co., Ltd., the mesh of which had an opening dimension of 0.106 mm. The application amount of the water absorbing resin was 4 g.

In addition, in order to form a valley by the surface of the paper to which the water absorbing resin was applied, the paper was folded into two parts. In this folded state, by using a pair of heating blocks, the folded paper was heat-pressed in the thickness direction thereof. The pressure was set to 0.3 kg/cm$^2$, and a heating temperature was set to 100° C. In addition, a heat-pressing time was two minutes.

Subsequently, after the heat application and the pressure application were released, the folded paper was cooled to ordinary temperature and was then cut by a shredder into small parts having a size of 2 mm×15 mm and a thickness of 1.0 mm. Accordingly, a liquid absorber was obtained.

In addition, the ratio of the total weight of the water absorbing resin to the total weight of the fibers was 0.50, and the average particle diameter of the water absorbing resin was 35 to 50 μm. In addition, in the small parts, the water absorbing resin was impregnated in the fiber base material.

Example 2

Except for that the ratio of the total weight of the water absorbing resin to the total weight of the fibers was changed as shown in Table 1, a liquid absorber was manufactured in a manner similar to that in Example 1.

Example 3

Except for that as the paper, paper having a whole surface on which printing was performed using a toner was used, a liquid absorber was manufactured in a manner similar to that in Example 2.

Example 4

Except for that the ratio of the total weight of the water absorbing resin to the total weight of the fibers was changed as shown in Table 1, a liquid absorber was manufactured in a manner similar to that in Example 1.

Example 5

Except for that as the paper, paper having a whole surface on which printing was performed using a toner was used, a liquid absorber was manufactured in a manner similar to that in Example 4.

Example 6

Except for that the ratio of the total weight of the water absorbing resin to the total weight of the fibers was changed as shown in Table 1, a liquid absorber was manufactured in a manner similar to that in Example 1.

Example 7

Except for that as the paper, paper having a whole surface on which printing was performed using a toner was used, a liquid absorber was manufactured in a manner similar to that in Example 2.

Examples 8 to 10

Except for that the ratio of the total weight of the water absorbing resin to the total weight of the fibers was changed as shown in Table 1, a liquid absorber was manufactured in a manner similar to that in Example 1.

Examples 11 and 12

Except for that the shapes of the small parts were changed as shown in Table 1, a liquid absorber was manufactured in a manner similar to that in Example 1.

Examples 13 to 19

Except for that the conditions of the small parts were changed as shown in Table 1, a liquid absorber was manufactured in a manner similar to that in Example 1.

In addition, as the water absorbing resin, Aqualic CA-W-101 manufactured by Nippon Shokubai Co., Ltd. was used.

Comparative Examples 1 and 2

Except for that the conditions of the small parts were changed as shown in Table 1, a liquid absorber was manufactured in a manner similar to that in Example 1.

Comparative Examples 3 and 4

Except for that as the small parts, small parts each formed from a non-folded fiber base material were used instead of using the small parts each formed from the folded fiber base material, and the conditions of the small parts were changed as shown in Table 1, a liquid absorber was manufactured in a manner similar to that in Example 1.

Comparative Examples 5 and 6

Except for that besides a water absorbing resin similar to that used in Comparative Example 1, ammonium phosphate was added as a flame retardant material, a liquid absorber was manufactured in a manner similar to that in Comparative Example 1. In addition, the use amount of the flame retardant material was set to 10 percent by mass of the small parts.

[2] Evaluation

[2-1] Fall of Water Absorbing Resin

First, a plurality of plastic containers, New Dispo Cups 100 mL manufactured by As One Corporation, were prepared, and 2.0 g of the liquid absorber manufactured in each of the examples and the comparative examples was received in each container.

Next, the liquid absorber received in the container was again recovered and was then spread on black paper to observe the fall of the water absorbing resin by visual inspection. In addition, the observation results were evaluated in accordance with the following criteria.

A: Falls of water absorbing resin are hardly observed.
B: Some falls of water absorbing resin are observed.
C: Many falls of water absorbing resin are observed.

The evaluation results are shown in Table 1.

[2-2] Absorption Characteristics

Next, as was the case of [2-1], after the liquid absorber was received in the container, 25 cc of ICBK-61 manufactured by Seiko Epson Corporation, which was a commercially available ink jet ink, was poured into the container. Subsequently, the inside of the container was observed by a visual inspection 2 minutes and 5 minutes after the end of the pour and was evaluated by the following criteria.

A: Surface of liquid absorber is not blurred with ink.
B: Although surface of liquid absorber is partially blurred, most of ink is absorbed, and no ink pool is observed.
C: Surface of liquid absorber is partially blurred, and ink pool is slightly observed.
D: Ink pool is observed on surface of liquid absorber.

The evaluation results are shown in Table 1.

[2-3] Flame Retardant Property

First, from the folded paper obtained in [1], a test piece having a size of 13 mm×125 mm was obtained by cutting. This test piece was similar to the small part of each of the examples and comparative examples except for the size.

Subsequently, by the HB test of the UL 94 Standard, the combustion rate of the test piece was measured. In addition, the measured combustion rate was evaluated in accordance with the following criteria.

A: Combustion rate is 65 mm/min or less, or combustion is stopped before reaching marked line.
B: Combustion rate is more than 65 mm/min to 70 mm/min.
C: Combustion rate is more than 70 mm/min to 75 mm/min.
D: Combustion rate is more than 75 mm/min.

The evaluation results are shown in Table 1.

TABLE 1

Table 1

| MANUFACTURING CONDITIONS OF LIQUID ABSORBER | | |
|---|---|---|
| SMALL PARTS | WATER ABSORBING RESIN | |
| | THERMOGRAVIMETRIC CHARACTERISTICS | RATE OF |
| | RATE OF WEIGHT DECREASE | RATE OF WEIGHT DECREASE | TOTAL WEIGHT OF WATER |
| PRESENCE OF TONER ON FIBER | AMOUNT AT 200° C. TO | AMOUNT AT 400° C. TO | ABSORBING RESIN TO TOTAL |

TABLE 1-continued

Table 1

|  | STRUCTURE | AREA a mm² | THICKNESS b mm | a^(1/2)/b | BASE MATERIAL | TYPE | INITIAL WEIGHT | INITIAL WEIGHT | WEIGHT OF FIBERS |
|---|---|---|---|---|---|---|---|---|---|
| EXAMPLE 1 | FOLDED STATE | 30 | 1.0 | 5.5 | NO | SANFRESH ST-500MPSA | 0.076 | 0.34 | 0.125 |
| EXAMPLE 2 | FOLDED STATE | 30 | 1.0 | 5.5 | NO |  | 0.076 | 0.34 | 0.25 |
| EXAMPLE 3 | FOLDED STATE | 30 | 1.0 | 5.5 | YES |  | 0.076 | 0.34 | 0.25 |
| EXAMPLE 4 | FOLDED STATE | 30 | 1.0 | 5.5 | NO |  | 0.076 | 0.34 | 0.50 |
| EXAMPLE 5 | FOLDED STATE | 30 | 1.0 | 5.5 | YES |  | 0.076 | 0.34 | 0.50 |
| EXAMPLE 6 | FOLDED STATE | 30 | 1.0 | 5.5 | NO |  | 0.076 | 0.34 | 0.75 |
| EXAMPLE 7 | FOLDED STATE | 30 | 1.0 | 5.5 | YES |  | 0.076 | 0.34 | 0.75 |
| EXAMPLE 8 | FOLDED STATE | 30 | 1.0 | 5.5 | NO |  | 0.076 | 0.34 | 1.00 |
| EXAMPLE 9 | FOLDED STATE | 30 | 1.0 | 5.5 | NO |  | 0.076 | 0.34 | 1.50 |
| EXAMPLE 10 | FOLDED STATE | 30 | 1.0 | 5.5 | NO |  | 0.076 | 0.34 | 2.00 |
| EXAMPLE 11 | FOLDED STATE | 20 | 1.0 | 4.5 | NO |  | 0.076 | 0.34 | 0.50 |
| EXAMPLE 12 | FOLDED STATE | 50 | 1.2 | 5.9 | NO |  | 0.076 | 0.34 | 0.50 |
| EXAMPLE 13 | FOLDED STATE | 125 | 1.5 | 7.5 | NO | AQUALIC CA-W-101 | 0.036 | 0.23 | 0.25 |
| EXAMPLE 14 | FOLDED STATE | 125 | 1.5 | 7.5 | NO |  | 0.036 | 0.23 | 0.50 |
| EXAMPLE 15 | FOLDED STATE | 125 | 1.5 | 7.5 | NO |  | 0.036 | 0.23 | 0.75 |
| EXAMPLE 16 | FOLDED STATE | 125 | 1.5 | 7.5 | NO |  | 0.036 | 0.23 | 1.00 |
| EXAMPLE 17 | FOLDED STATE | 125 | 1.5 | 7.5 | NO |  | 0.036 | 0.23 | 1.50 |
| EXAMPLE 18 | FOLDED STATE | 100 | 1.2 | 8.3 | NO |  | 0.036 | 0.23 | 0.50 |
| EXAMPLE 19 | FOLDED STATE | 100 | 1.0 | 10.0 | NO |  | 0.036 | 0.23 | 0.50 |
| COMPARATIVE EXAMPLE 1 | FOLDED STATE | 30 | 1.0 | 5.5 | NO | — | 0.112 | 0.56 | 0.25 |
| COMPARATIVE EXAMPLE 2 | FOLDED STATE | 125 | 1.5 | 7.5 | NO | — | 0.112 | 0.56 | 0.25 |
| COMPARATIVE EXAMPLE 3 | UNFOLDED STATE | 30 | 0.5 | 11.0 | NO | SANFRESH ST-500MPSA | 0.076 | 0.34 | 0.25 |
| COMPARATIVE EXAMPLE 4 | UNFOLDED STATE | 125 | 0.8 | 14.0 | NO | AQUALIC CA-W-101 | 0.036 | 0.23 | 0.25 |
| COMPARATIVE EXAMPLE 5 | FOLDED STATE | 30 | 1.0 | 5.5 | NO | — | ADDITION OF FLAME RETARDANT MATERIAL |  | — |
| COMPARATIVE EXAMPLE 6 | FOLDED STATE | 125 | 1.5 | 7.5 | NO | — | ADDITION OF FLAME RETARDANT MATERIAL |  | — |

| | EVALUATION RESULT | | | |
|---|---|---|---|---|
| | FALL OF WATER ABSORBING RESIN | ABSORPTION CHARACTERISTICS 2 MINUTES AFTER | ABSORPTION CHARACTERISTICS 5 MINUTES AFTER | FLAME RETARDANT PROPERTY |
| EXAMPLE 1 | A | D | C | C |
| EXAMPLE 2 | A | A | A | A |
| EXAMPLE 3 | A | A | A | A |
| EXAMPLE 4 | A | A | A | A |
| EXAMPLE 5 | A | B | B | B |
| EXAMPLE 6 | A | A | A | A |
| EXAMPLE 7 | A | A | A | A |
| EXAMPLE 8 | A | A | A | A |
| EXAMPLE 9 | B | B | B | A |

TABLE 1-continued

Table 1

| | | | | |
|---|---|---|---|---|
| EXAMPLE 10 | C | A | A | A |
| EXAMPLE 11 | A | D | C | A |
| EXAMPLE 12 | A | C | C | A |
| EXAMPLE 13 | A | B | B | B |
| EXAMPLE 14 | A | A | A | A |
| EXAMPLE 15 | A | A | A | A |
| EXAMPLE 16 | A | A | A | A |
| EXAMPLE 17 | B | B | B | A |
| EXAMPLE 18 | A | C | C | A |
| EXAMPLE 19 | A | C | C | A |
| COMPARATIVE EXAMPLE 1 | A | A | A | D |
| COMPARATIVE EXAMPLE 2 | A | A | A | D |
| COMPARATIVE EXAMPLE 3 | C | D | B | D |
| COMPARATIVE EXAMPLE 4 | C | D | B | D |
| COMPARATIVE EXAMPLE 5 | A | D | D | A |
| COMPARATIVE EXAMPLE 6 | A | D | D | A |

As apparent from Table 1, in the examples, excellent absorption characteristics and an excellent flame retardant property could be confirmed. In addition, the falls of the water absorbing resin in the small parts were hardly observed.

On the other hand, in the comparative examples, the water absorption characteristics and the flame retardant property could not be simultaneously achieved. In addition, the falls of the water absorbing resin were also observed in some cases.

In addition, except for that the ink jet ink (ICBK80) manufactured by Seiko Epson Corporation was changed to an ink jet ink (BCI-381sBK) manufactured by Canon Inc., an ink jet ink (LC3111BK) manufactured by Brother Industries, Ltd., and an ink jet ink (HP 61XL CH563WA) manufactured by Hewlett-Packard Japan, Ltd., evaluation was performed in a manner similar to that described above, and results similar to those described above could be obtained.

What is claimed is:

1. A liquid absorber comprising:
a plurality of small parts each including a first layer containing fibers, a second layer containing fibers, and a third layer which contains a water absorbing resin and which is provided between the first layer and the second layer, wherein
when the water absorbing resin is measured to obtain a TG curve in accordance with a plastic thermogravimetric measurement method defined by JIS K 7120: 1987 under measurement conditions in which a sample amount is 5 to 15 mg, a temperature increase rate is 10.0° C./min, and a measurement atmosphere is nitrogen, from the TG curve, the ratio of a weight decrease amount of the water absorbing resin at 400° C. with respect to an initial weight thereof is 0.050 to less than 0.500.

2. The liquid absorber according to claim 1, wherein in the TG curve, the ratio of a weight decrease amount of the water absorbing resin at 200° C. with respect to the initial weight thereof is 0.001 to less than 0.080.

3. The liquid absorber according to claim 1, wherein the ratio of the total weight of the water absorbing resin with respect to the total weight of the fibers is 0.15 to 1.75.

4. The liquid absorber according to claim 1, wherein the fibers are cellulose fibers.

5. The liquid absorber according to claim 1, wherein the small parts each have two primary surfaces in a front-rear relationship, and
$a^{1/2}/b>5.0$ and $0.05 \leq b \leq 10.0$ hold, wherein a represents the area of the primary surface [mm$^2$], and b represents the thickness of the small part in a direction normal to the primary surface thereof [mm].

6. An ink absorbing device comprising:
the liquid absorber according to claim 1; and
a container receiving the liquid absorber.

7. A liquid droplet ejection apparatus comprising:
a recovery portion recovering a waste ink liquid, wherein the ink absorbing device according to claim 6 is provided in the recovery portion.

* * * * *